(12) United States Patent
Kim et al.

(10) Patent No.: US 8,634,470 B2
(45) Date of Patent: Jan. 21, 2014

(54) MULTIMEDIA DECODING METHOD AND MULTIMEDIA DECODING APPARATUS BASED ON MULTI-CORE PROCESSOR

(75) Inventors: Yun-il Kim, Seoul (KR); Hyun-ki Baik, Seongnam-si (KR); Grigory Abuladze, Suwon-si (KR); Se-hyun Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1155 days.

(21) Appl. No.: 12/179,023

(22) Filed: Jul. 24, 2008

(65) Prior Publication Data
US 2009/0049281 A1 Feb. 19, 2009

Related U.S. Application Data

(60) Provisional application No. 60/951,567, filed on Jul. 24, 2007.

(30) Foreign Application Priority Data

Dec. 7, 2007 (KR) ........................ 10-2007-0126891

(51) Int. Cl.
*H04N 7/12* (2006.01)
*H04N 11/02* (2006.01)
*H04N 11/04* (2006.01)

(52) U.S. Cl.
USPC ................................ 375/240.16; 375/240.24

(58) Field of Classification Search
None
See application file for complete search history.

(56) References Cited

U.S. PATENT DOCUMENTS

| 5,166,674 | A | 11/1992 | Baum et al. |
| 8,213,518 | B1* | 7/2012 | Wang et al. .............. 375/240.25 |
| 2004/0057465 | A1 | 3/2004 | Chen et al. |
| 2005/0062746 | A1* | 3/2005 | Kataoka et al. ............... 345/505 |
| 2006/0056517 | A1* | 3/2006 | MacInnis et al. ........ 375/240.23 |
| 2006/0078052 | A1* | 4/2006 | Dang ........................ 375/240.24 |
| 2007/0074004 | A1* | 3/2007 | Wong et al. ..................... 712/34 |
| 2007/0253491 | A1* | 11/2007 | Ito et al. ................... 375/240.24 |
| 2008/0025409 | A1* | 1/2008 | Tseng et al. .............. 375/240.25 |

(Continued)

FOREIGN PATENT DOCUMENTS

| JP | 2004-318901 A | 11/2004 |
| KR | 1020060053568 A | 5/2006 |
| KR | 10-2006-0100945 A | 9/2006 |
| WO | 2005066792 A2 | 7/2005 |

OTHER PUBLICATIONS

ITU-T H.264, "Series H: Audiovisual and Multimedia Systems / Infrastructure of audiovisual services—Coding of moving video / Advanced video coding for generic audiovisual services", Jan. 2012, International Telecommunication Union.

*Primary Examiner* — Suk Jin Kang
(74) *Attorney, Agent, or Firm* — Sughrue Mion, PLLC (57) ABSTRACT

Provided are a multimedia decoding method and multimedia decoding apparatus based on a multi-core platform including a central processor and a plurality of operation processors. The multimedia decoding method includes performing a queue generation operation on input multimedia data to generate queues of one or more operations of the multimedia data which are to be performed by the central processor and the operation processors, wherein the queue generation operation is performed by the central processor; performing motion compensation operations on partitioned data regions of the multimedia data by one or more motion compensation processors among the operation processors; and performing a deblocking operation on the multimedia data by a deblocking processor among the operation processors.

29 Claims, 9 Drawing Sheets

(56) References Cited

U.S. PATENT DOCUMENTS

| | | | |
|---|---|---|---|
| 2008/0170611 A1* | 7/2008 | Ramaswamy | 375/240.01 |
| 2008/0187053 A1* | 8/2008 | Zhao et al. | 375/240.25 |
| 2008/0219349 A1* | 9/2008 | Huang et al. | 375/240.15 |
| 2008/0225950 A1* | 9/2008 | Zhu | 375/240.14 |
| 2008/0240254 A1* | 10/2008 | Au et al. | 375/240.24 |
| 2008/0307198 A1* | 12/2008 | Kataoka et al. | 712/28 |
| 2009/0002379 A1* | 1/2009 | Baeza et al. | 345/522 |
| 2009/0010326 A1* | 1/2009 | Rossholm et al. | 375/240.03 |
| 2009/0052542 A1* | 2/2009 | Romanovskiy et al. | 375/240.24 |
| 2009/0245349 A1* | 10/2009 | Zhao et al. | 375/240.03 |
| 2010/0027680 A1* | 2/2010 | Segall et al. | 375/240.24 |
| 2010/0040148 A1* | 2/2010 | Marpe et al. | 375/240.16 |
| 2010/0142618 A1* | 6/2010 | Pandit et al. | 375/240.16 |
| 2012/0189067 A1* | 7/2012 | Dang | 375/240.29 |

\* cited by examiner

MULTIMEDIA DECODING METHOD AND MULTIMEDIA DECODING APPARATUS BASED ON MULTI-CORE PROCESSOR

CROSS-REFERENCE TO RELATED PATENT APPLICATIONS

This application claims priority from U.S. Provisional Application No. 60/951,567, filed on Jul. 24, 2007 in the U.S. Patent and Trademark, and Korean Patent Application No. 10-2007-0126891, filed on Dec. 7, 2007 in the Korean Intellectual Property Office, the disclosures of which are incorporated herein in their entirety by reference.

BACKGROUND OF THE INVENTION

1. Field of the Invention

Methods and apparatuses consistent with the present invention relate to multimedia decoding, and more particularly, to efficiently designing a multimedia decoding system and an efficient decoding apparatus based on a multi-core platform.

2. Description of the Related Art

H.264 data has high capacity and is operationally intensive, and thus an efficient method of decoding the H.264 data in an asymmetric multi-core platform has been suggested. However, unlike Moving Pictures Experts Group 2 (MPEG-2) data that can be processed in slices, the H.264 data has mutual dependency between different frames or in the same frame and thus a decoding apparatus based on a multi-core platform may not easily process the H.264 data in parallel.

Related art partitioning methods for processing the H.264 data in parallel includes a data partitioning method that partitions data to be processed by processors and a functional partitioning method that partitions operations of operation modules as in a pipeline method.

Figure 1:
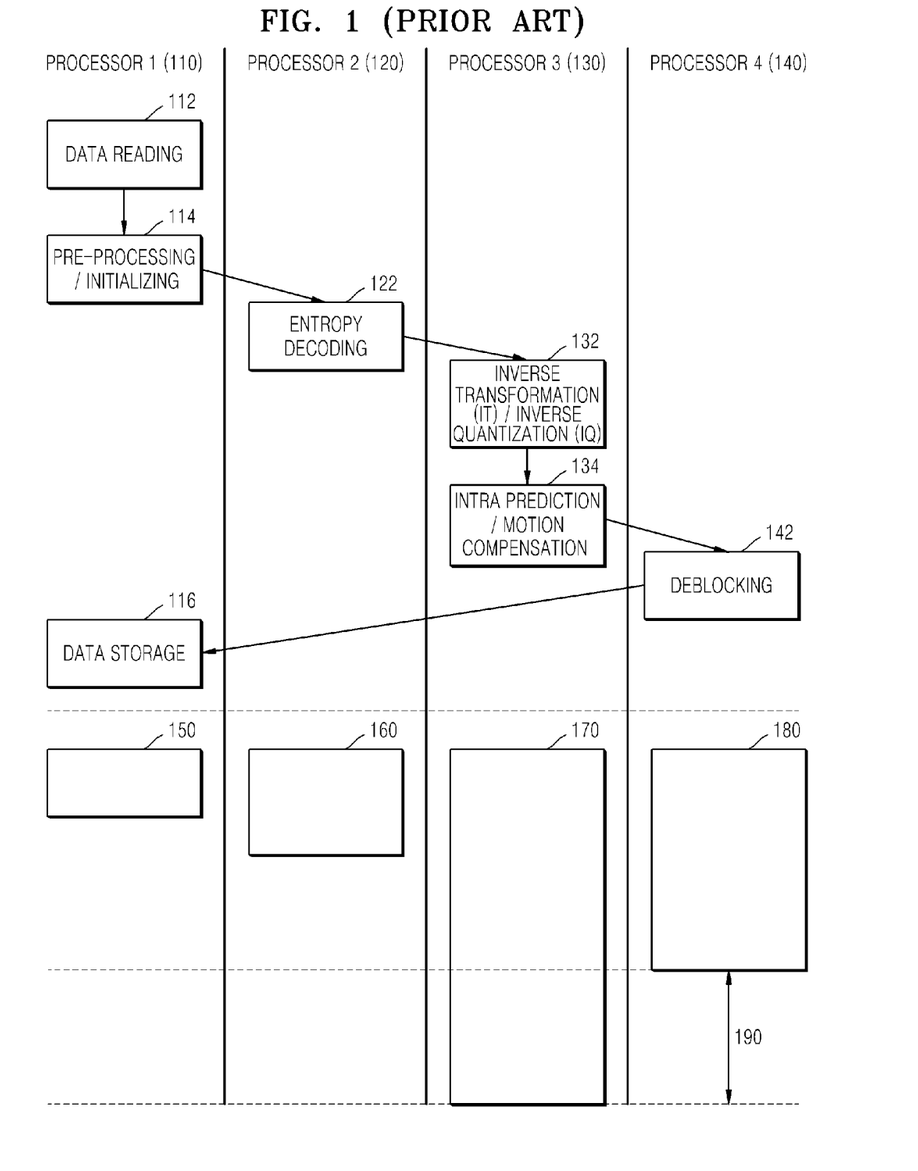
FIG. 1 is a diagram illustrating an example of a multi-core platform system using a functional partitioning method according to the related art.

FIG. 1 is a diagram illustrating an example of a multi-core platform system using a functional partitioning method according to the related art.

In the functional partitioning method, the multi-core platform system includes a plurality of processors and certain functions are allocated to the processors. For example, the multi-core platform system may include first through fourth processors 110, 120, 130, and 140. A data reading function 112, a pre-processing and initializing function 114, and a data storage function 116 are allocated to the first processor 110, and an entropy decoding function 122 is allocated to the second processor 120. An inverse transformation and inverse quantization function 132 and an intra prediction and motion compensation function 134 are allocated to the third processor 130, and a deblocking function 142 is allocated to the fourth processor 140.

If operation loads of the first through fourth processors 110, 120, 130, and 140 are not equal, the functional partitioning method may not guarantee a predetermined performance. In more detail, processing times 150, 160, 170, and 180 of the first through fourth processors 110, 120, 130, and 140 are different from each other and thus a critical path corresponding to an excess processing time 190 is created in the multi-core platform system due to the processing time 170 of the third processor 130 which is the longest processing time. Accordingly, data may not be efficiently processed in parallel and usability of the multi-core platform system may be reduced.

Figure 2A:
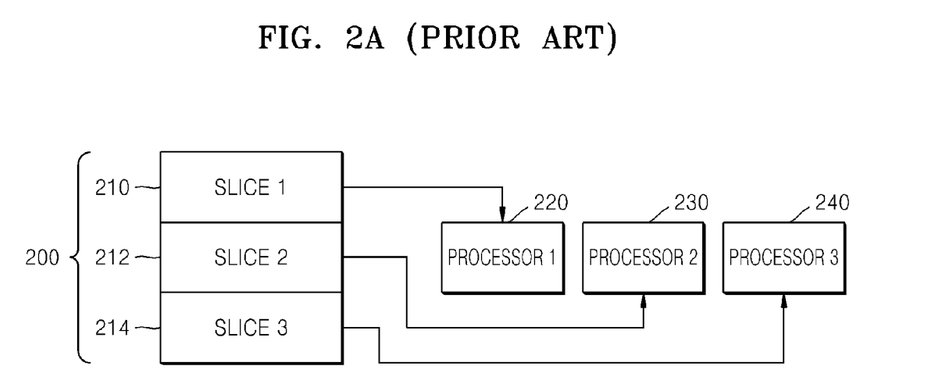
FIGS. 2A and 2B are diagrams illustrating examples of a multi-core platform system using a data partitioning method according to the related art.
Figure 2B:
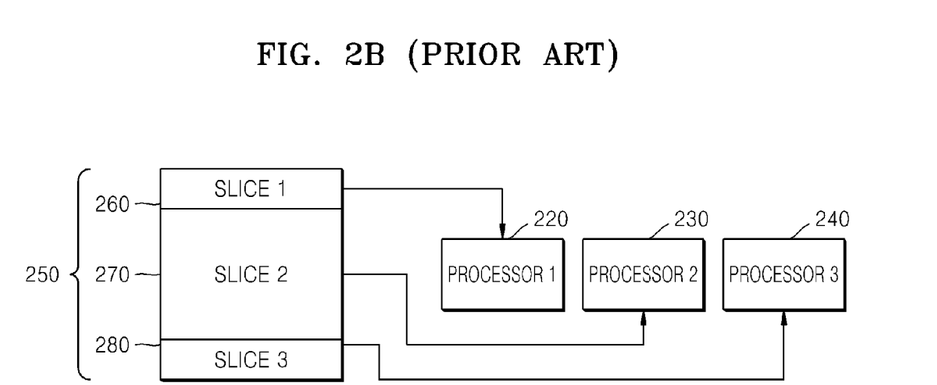

FIGS. 2A and 2B are diagrams illustrating examples of a multi-core platform system using a data partitioning method according to the related art.

Referring to FIG. 2A, according to an example of the data partitioning method, a frame 200 is partitioned into first through third slices 210, 212, and 214 which are respectively processed by first through third processors 220, 230, and 240. That is, each of the first through third processors 220, 230, and 240 performs a whole decoding method. In the data partitioning method, simple data processing may be efficiently performed in parallel. However, if mutual dependency exists between pieces of data, the data partitioning method may not be easily performed and an additional operation is required to solve a problem in terms of the mutual dependency so that the performance of the data partitioning method is greatly reduced. Thus, the data partitioning method is appropriately performed in an H.264-based decoding system that requires intra prediction as well as inter prediction.

Referring to FIG. 2B, according to another example of the data partitioning method, a frame 250 is partitioned into first through third slices 260, 270, and 280 which are processed by the first through third processors 220, 230, and 240, respectively. In FIG. 2B, correlations between data sizes and operation loads of the first through third slices 260, 270, and 280 may not be easily predicted. That is, each of the first and third processors 220 and 240 which respectively process the first and third slices 260 and 280 has a small operation load, while the second processor 230 that processes the second slice 270 has a large operation load. In more detail, due to different sizes of the first through third slices 260, 270, and 280, the operation loads are not equally allocated to the first through third processors 220, 230, and 240 and thus resources may not be efficiently utilized.

Also, if mutual dependency exists between pieces of data, a parallel processing structure may not be easily implemented and much processing time may be required. Furthermore, each core has to have data on whole operations, while local resources of the multi-core platform system are restrictive, which causes inefficiency.

Figure 3A:
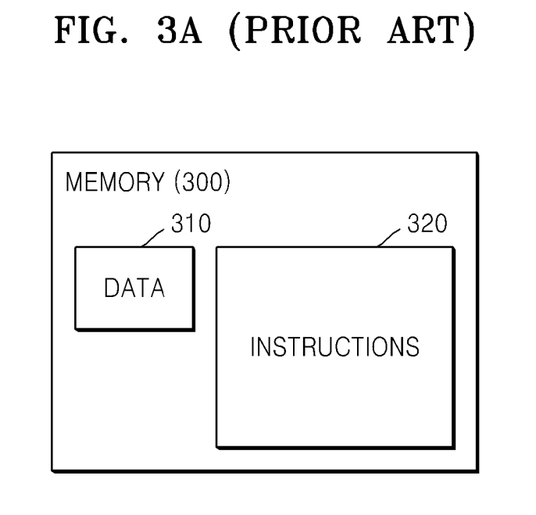
FIGS. 3A and 3B are diagrams for describing differences of data-instruction distributions in accordance with characteristics of applications according to the related art.
Figure 3B:
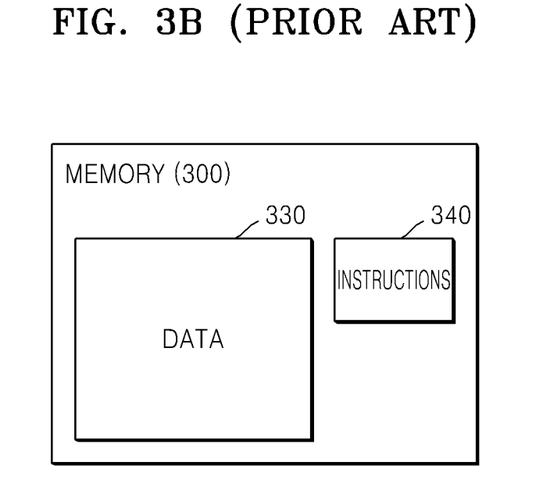

FIGS. 3A and 3B are diagrams for describing differences of data-instruction distributions in accordance with characteristics of applications according to the related art.

When an operation is performed, both data and instructions are required. As in a memory 300 illustrated in FIG. 3A, when the size of data 310 is small, while the size of instructions 320 is large, a functional partitioning method is more advantageous than a data partitioning method. On the other hand, as in the memory 300 illustrated in FIG. 3B, when the size of data 330 is large, while the size of instructions 340 is small, the data partitioning method is more advantageous than the functional partitioning method.

However, data-instruction characteristics may vary in accordance with characteristics of applications and may also vary in accordance with modules of a program. Accordingly, if a partitioning method of multiprocessors for processing data in parallel is determined to be only one of the functional partitioning method and the data partitioning method, the data may not be flexibly processed in accordance with the data-instruction characteristics.

Furthermore, in a single-core based H.264 decoding system, the size of instructions is 820 kilobytes (KB) and the size of data is 200 KB, while the size of a local memory is only 256 KB. Thus, the H.264 decoding system may not be efficiently implemented by using restrictive resources of the local memory.

SUMMARY OF THE INVENTION

The present invention provides a multimedia decoding method and multimedia decoding apparatus based on a multi-core platform, in which the multimedia data having high capacity and being operationally intensive may be efficiently processed in parallel by effectively using multiprocessor resources.

The present invention also provides a method of using advantages of a data partitioning method and a functional partitioning methods and equally allocating operation loads to multiprocessors in order to efficiently process the multimedia data in parallel.

The present invention also provides a queuing method of efficiently providing operation instructions to multiprocessors and an efficient data communication method between the multiprocessors.

According to an aspect of the present invention, there is provided a multimedia decoding method based on a multi-core platform including a central processor and a plurality of operation processors, the multimedia decoding method including performing a queue generation operation on input multimedia data so as to generate queues of one or more operations of the multimedia data which are to be performed by the central processor and the operation processors, wherein the queue generation operation is performed by the central processor; performing motion compensation operations on partitioned data regions of the multimedia data by one or more motion compensation processors from among all the operation processors; and performing a deblocking operation on the multimedia data by a deblocking processor from among all the operation processors.

The multimedia decoding method may further include reading the input multimedia data by the central processor; performing an initializing operation on the read multimedia data in order to decode the multimedia data by the central processor; performing an entropy decoding operation on the initialized multimedia data by the central processor; performing at least one of an inverse transformation operation, an inverse quantization operation, and an intra prediction operation on the multimedia data by the central processor; and storing the deblocked multimedia data by the central processor, and the performing of the queue generation operation may include performing the queue generation operation on the entropy decoded multimedia data.

The performing of the queue generation operation may include inputting operation parameter blocks including operation parameters of the operations to the queues.

The performing of the queue generation operation may include transmitting the operation parameter blocks from the queues to the operation processors corresponding to the queues.

The transmitting of the operation parameter blocks may include determining the operation parameter blocks which are processed by the operation processors for a predetermined unit period of time; and transmitting the determined operation parameter blocks to the operation processors at each unit period of time.

The multimedia decoding method may further include partitioning the multimedia data into one or more data regions; and determining the motion compensation processors which are designated to perform the motion compensation operations on the partitioned data regions, and, if a queue of the motion compensation operations is generated, the performing of the queue generation operation may include generating the queue of the motion compensation operations which includes operation parameter blocks to be performed on the data regions by the motion compensation processors.

The partitioning of the multimedia data into the data regions may include calculating operation loads of the motion compensation processors for the motion compensation operations of the multimedia data; determining a number of data regions of the multimedia data to be partitioned, in consideration of the calculated operation loads; and partitioning the multimedia data into the data regions in accordance with the determined number of data regions, and the determining of the motion compensation processors may include determining the number of the motion compensation processors to be the same as the number of data regions of the multimedia data.

The partitioning of the multimedia data into the data regions may include detecting pieces of data having mutual dependency on each other, from the multimedia data; and determining the data regions so as not to separate the pieces of data having mutual dependency on each other.

If a first piece of data has mutual dependency on two or more other pieces of data, the determining of the data regions may include determining one of the other pieces of data so as to be included in the same data region in which the first piece of data is to be included.

The performing of the queue generation operation may include storing the operation parameter blocks of the partitioned data regions in the queue of the motion compensation operations in accordance with a processing order of the data regions; and transmitting the operation parameter blocks of the partitioned data regions from the queue of the motion compensation operations to the motion compensation processors in accordance with the processing order of the data regions.

Synchronization signals may be exchanged between the central processor and the operation processors through a mailbox.

Data may be exchanged between a memory of the central processor and memories of the operation processors by using a direct memory access (DMA) method.

The motion compensation operations which are performed on the data regions by the motion compensation processors may be synchronized.

Operations of the central processor and the operation processors may be performed in parallel in a pipeline structure.

Assuming that each data processing unit of the multimedia data is partitioned into N data units and n is a positive number greater than 1 and less than N, the operations of the central processor and the operation processors may include performing the entropy decoding operation and the queue generation operation on an (n−1)th data unit by the central processor; performing the motion compensation operations on the (n−1)th data unit by the motion compensation processors, and performing the entropy decoding operation and the queue generation operation on an (n) th data unit by the central processor; and performing the inverse transformation operation, the inverse quantization operation, and the intra prediction operation on the (n−1)th data unit by the central processor, performing the motion compensation operations on the (n) th data unit by the motion compensation processors, performing the entropy decoding operation and the queue generation operation on an (n+1)th data unit by the central processor, and performing the deblocking operation on the (n−1)th data unit by the deblocking processor so as to restore the (n−1)th data unit.

According to another aspect of the present invention, there is provided a multimedia decoding apparatus based on a multi-core platform including a central processor and a plurality of operation processors, the multimedia decoding apparatus including a queue generation unit for performing a queue generation operation on input multimedia data so as to generate queues of one or more operations of the multimedia data which are to be performed by the central processor or the operation processors by the central processor; a motion compensation unit for performing motion compensation operations on partitioned data regions of the multimedia data by one or more motion compensation processors from among all the operation processors; and a deblocking unit for performing a deblocking operation on the multimedia data by a deblocking processor from among all the operation processors.

The central processor may read the input multimedia data, perform an initializing operation on the read multimedia data in order to decode the multimedia data, perform an entropy decoding operation on the initialized multimedia data, perform at least one of an inverse transformation operation, an inverse quantization operation, and an intra prediction operation on the multimedia data, and store the deblocked multimedia data, and the queue generation unit may perform the queue generation operation on the entropy decoded multimedia data.

According to another aspect of the present invention, there is provided a computer readable recording medium having recorded thereon a computer program for executing a multimedia decoding method based on a multi-core platform including a central processor and a plurality of operation processors.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

For convenience of explanation, data units used in the present invention are defined in advance.

Data processing units are units such as frames, slices, and pictures which partition multimedia data based on a predetermined standard.

The data units are a plurality of partitioned pieces of one data processing unit so that the partitioned pieces may be sequentially processed by one processor in order to efficiently process the data processing unit having a large amount of data. For example, a frame may be partitioned into a plurality of data units.

A data region includes one or more data processing units so that multimedia data is simultaneously processed by a plurality of processors in order to efficiently process the multimedia data. For example, the data region may include one or more frames.

Hereinafter, the present invention will be described in detail by explaining exemplary embodiments of the invention with reference to the attached drawings.

Figure 4:
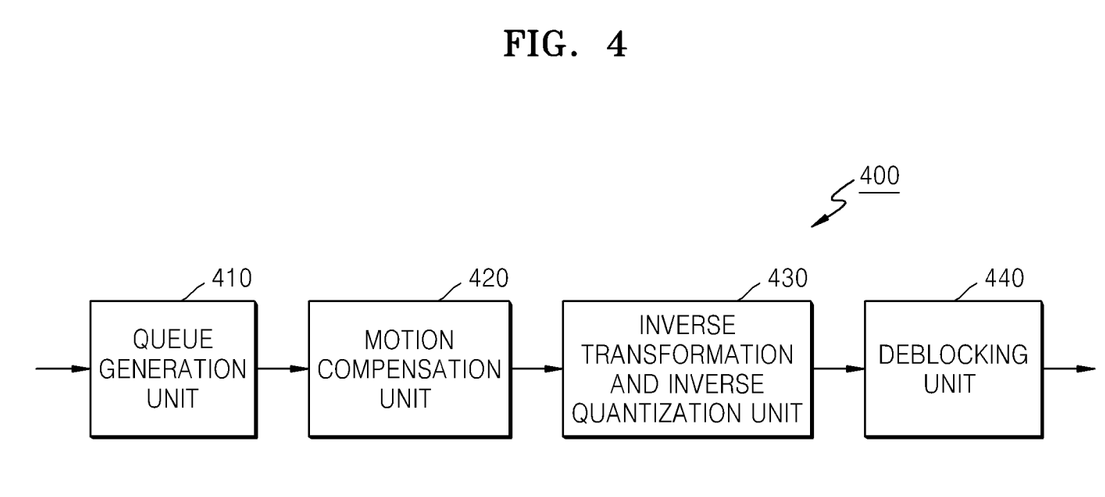
FIG. 4 is a block diagram of a multimedia decoding apparatus for data based on a multi-core platform, according to an exemplary embodiment of the present invention.

FIG. 4 is a block diagram of a multimedia decoding apparatus 400 based on a multi-core platform, according to an exemplary embodiment of the present invention.

Referring to FIG. 4, the multimedia decoding apparatus 400 includes a queue generation unit 410, a motion compensation unit 420, an inverse transformation and inverse quantization unit 430, and a deblocking unit 440. The multimedia decoding apparatus 400 based on the multi-core platform includes a plurality of operation processors. The multimedia decoding apparatus 400 may include a central processor and one or more operation processors.

The queue generation unit 410 performs a queue generation operation on input multimedia data so as to generate queues of one or more operations of the multimedia data which are to be performed by the central processor or the operation processors. The queues are generated by the central processor. Thus, the queue generation unit 410 may be included in the central processor.

The central processor may read the input multimedia data and perform an initializing operation on the read multimedia data in order to decode the multimedia data, before the queue generation unit 410 performs the queue generation operation. Then, the central processor may also perform an entropy decoding operation, an inverse transformation operation, an inverse quantization operation, and an intra prediction operation on the initialized multimedia data. The queue generation unit 410 may perform the queue generation operation on the entropy decoded multimedia data.

The queue generation unit 410 may determine operation parameter blocks which are processed by the operation processors for a predetermined unit period of time and transmit the determined operation parameter blocks to the operation processors at each unit period of time.

The queue generation unit 410 may input the operation parameter blocks including operation parameters of the operations to the queues. Also, the queue generation unit 410 may transmit the operation parameter blocks from the queues to the operation processors corresponding to the queues.

Although not shown in FIG. 4, the multimedia decoding apparatus 400 may further include a data region partitioning unit for partitioning the multimedia data into one or more data regions. The multimedia decoding apparatus 400 may determine separate motion compensation processors which are designated to perform motion compensation operations on the partitioned data regions.

The queue generation unit 410 may generate a queue of the motion compensation operations which include operation parameter blocks to be performed on the data regions by the motion compensation processors.

When each data processing period of the multimedia data is partitioned into one or more data regions, the data region partitioning unit calculates operation loads of the motion compensation processors for the motion compensation operations of the multimedia data, determines the number of data regions of the multimedia data to be partitioned, in consideration of the calculated operation loads, and partitions the multimedia data into the data regions in accordance with the determined number of data regions. Also, the number of the motion compensation processors is determined to be the same as the number of data regions of the multimedia data.

The multimedia data may be partitioned by detecting pieces of data having mutual dependency on each other, from the multimedia data, and determining the data regions so as not to separate the pieces of data having mutual dependency on each other.

In order not to separate the pieces of data having mutual dependency on each other, if a first piece of data has mutual dependency on two or more other pieces of data, one of the other pieces of data may be determined so as to be included in the same data region in which the first piece of data is to be included.

The queue generation unit 410 may store the operation parameter blocks of the partitioned data regions in the queue of the motion compensation operations in accordance with a processing order of the data regions, and transmit the operation parameter blocks of the partitioned data regions from the queue of the motion compensation operations to the motion compensation processors in accordance with the processing order of the data regions.

The motion compensation unit 420 performs the motion compensation operations on the partitioned data regions of the multimedia data by one or more motion compensation processors from among all the operation processors.

The inverse transformation and inverse quantization unit 430 performs the inverse transformation operation and the inverse quantization operation on the motion compensated multimedia data. The inverse transformation and inverse quantization unit 430 may be included in the central processor.

The deblocking unit 440 performs a deblocking operation on the inverse transformed and inverse quantized multimedia data.

The central processor may store the deblocked multimedia data.

Figure 5:
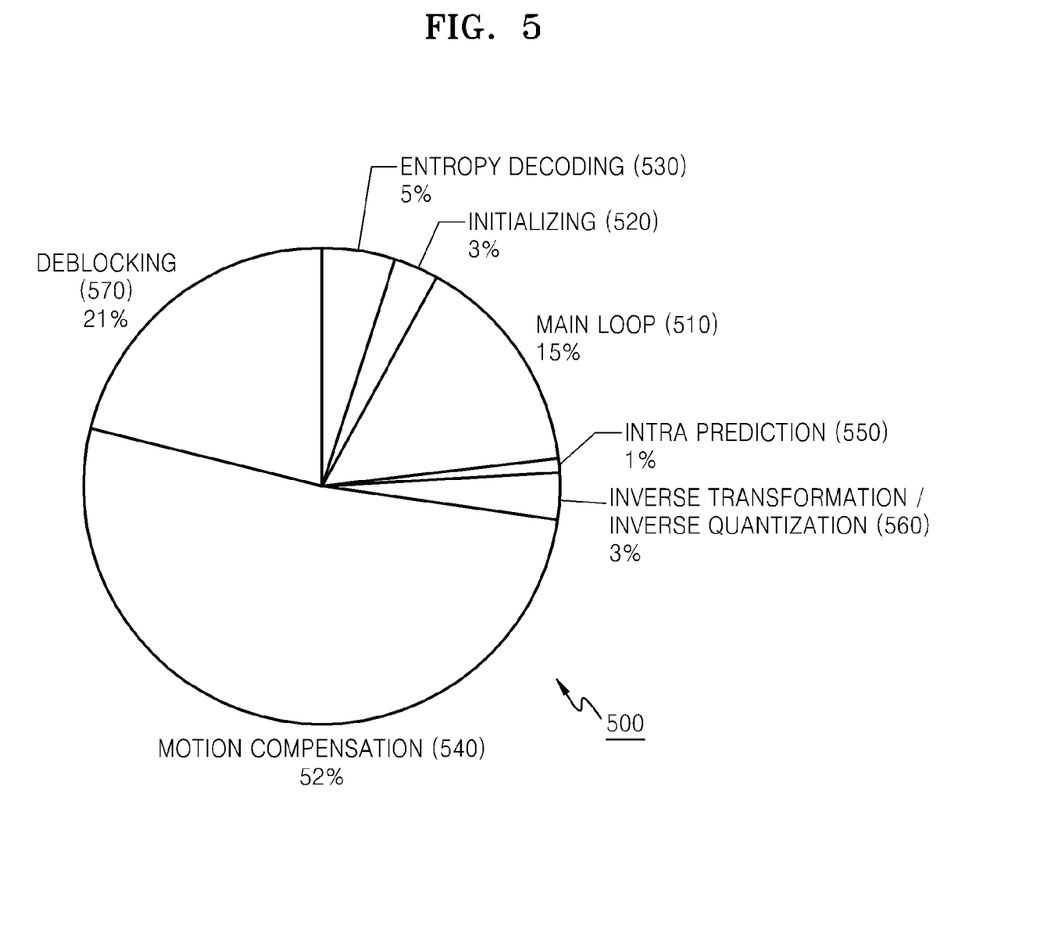
FIG. 5 is a circle graph illustrating distributions of operation loads, according to an exemplary embodiment of the present invention.

FIG. 5 is a circle graph 500 illustrating distributions of operation loads, according to an exemplary embodiment of the present invention.

Referring to FIG. 5, the circle graph 500 illustrates an example of time that is taken when each operation is performed by the multimedia decoding apparatus 400 illustrated in FIG. 4 in order to decode multimedia data.

As a percentage of the total time that is taken to decode the multimedia data, time that is taken to perform a main loop operation 510 is 15%, time that is taken to perform an initializing operation 520 is 3%, time that is taken to perform an entropy decoding operation 530 is 5%, time that is taken to perform a motion compensation operation 540 is 52%, time that is taken to perform an intra prediction operation 550 is 1%, time that is taken to perform an inverse transformation and inverse quantization operation 560 is 3%, and time that is taken to perform a deblocking operation 570 is 21%.

A central processor may perform the main loop operation 510, the initializing operation 520, the intra prediction operation 550, and the inverse transformation and inverse quantization operation 560. Some operation processors may perform the motion compensation operation 540 and another operation processor may perform the deblocking operation 570.

Figure 6:
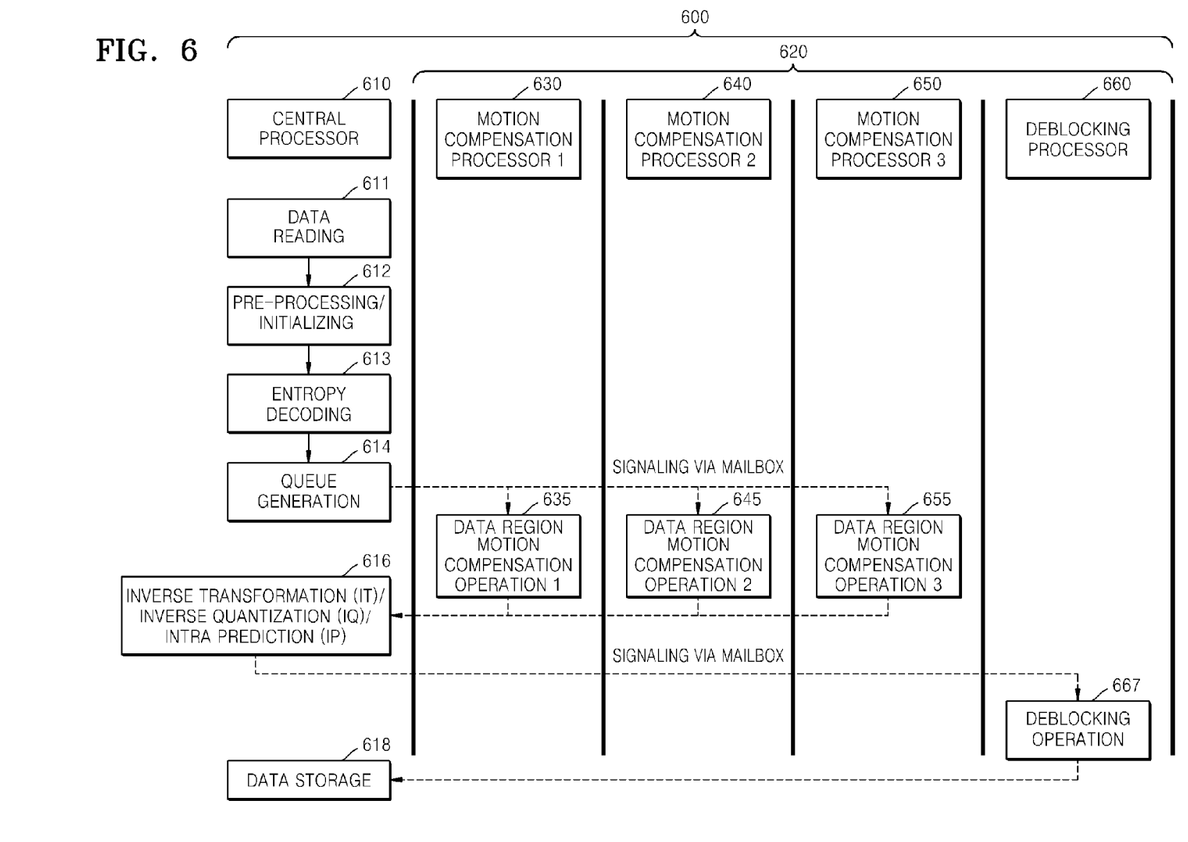
FIG. 6 is a diagram for describing a hybrid partitioning method that is performed by a multimedia decoding apparatus, according to an exemplary embodiment of the present invention.

FIG. 6 is a diagram for describing a hybrid partitioning method that is performed by a multimedia decoding apparatus 600 for decoding multimedia data, according to an exemplary embodiment of the present invention.

Referring to FIG. 6, the multimedia decoding apparatus 600 is based on a multi-core platform and includes a central processor 610 and a plurality of operation processors 620. The operation processors 620 may include three motion compensation processors 630, 640, and 650 and a deblocking processor 660.

In the multimedia decoding apparatus 600, the central processor 610 performs a data reading operation 611, a preprocessing and initializing operation 612, an entropy decoding operation 613, a queue generation operation 614, an inverse transformation, inverse quantization, and intra prediction operation 616, and a data storage operation 618. The motion compensation processors 630, 640, and 650 perform data region motion compensation operations 635, 645, and 655, respectively, and the deblocking processor 660 performs a deblocking operation 667. This corresponds to a functional partitioning method in the multi-core platform.

Also, the multimedia decoding apparatus 600 partitions each data processing unit of the multimedia data into one or more data regions and the motion compensation processors 630, 640, and 650 respectively perform the data region motion compensation operations 635, 645, and 655 on corresponding data regions. This corresponds to a data partitioning method in the multi-core platform.

Thus, in order to determine the amount of operations performed by each processor in consideration of an operation load of each operation, the multimedia decoding apparatus 600 adopts the hybrid partitioning method in which the functional partitioning method and the data partitioning method are combined.

In order to determine the number of motion compensation processors, operation loads of the motion compensation processors are calculated. The number of data regions of the multimedia data to be partitioned is determined in consideration of the calculated operation loads and the multimedia data is partitioned into data regions in accordance with the determined number of data regions. Thus, the number of the motion compensation processors is determined to be the same as the number of data regions of the multimedia data.

Synchronization signals may be exchanged between the central processor 610 and the operation processors 620 through a mailbox.

Figure 7:
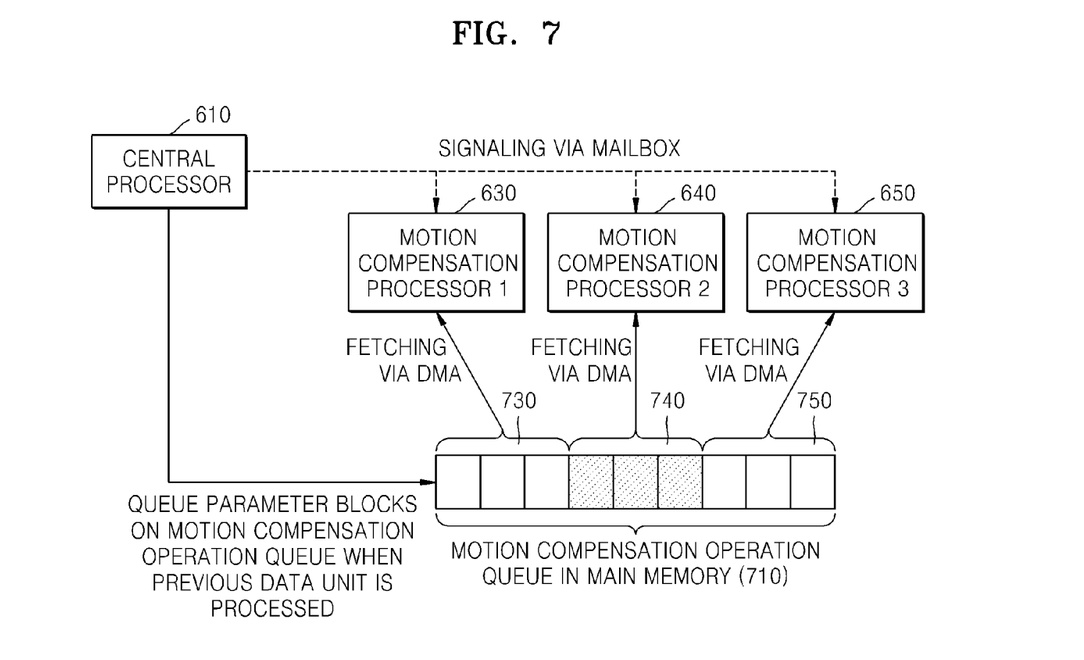
FIG. 7 is a diagram for describing a queuing method and a data communication method between processors, according to an exemplary embodiment of the present invention.

FIG. 7 is a diagram for describing a queuing method and a data communication method between processors, according to an exemplary embodiment of the present invention.

As described above with reference to FIG. 4, a queue generation unit generates queues including operation parameters of operations to be performed by operation processors. That is, the queue generation unit generates the queues by sequentially stacking parameter blocks including the operation parameters of the operations and related data on the queues in accordance with a processing order of the operations which are to be processed by the operation processors. Thus, the queue generation unit generates the queues including a queue of motion compensation operations, a queue of a deblocking operation, and an inverse transformation/inverse quantization/intra predict ion.

The queuing method will now be described with reference to the motion compensation operations in FIG. 7.

Referring to FIG. 7, a central processor 610 sequentially stacks motion compensation operation parameter blocks 730, 740, and 750 which are received from the motion compensation processors 630, 640, and 650, on a motion compensation operation queue 710 of a main memory. The main memory is a memory of the central processor 610.

Also, the motion compensation operation parameter blocks 730, 740, and 750 respectively correspond to the motion compensation processors 630, 640, and 650 which perform the motion compensation operations on corresponding partitioned data regions and thus are respectively output to the motion compensation processors 630, 640, and 650 in accordance with the processing order. Data may be exchanged between the main memory and memories of the motion compensation processors 630, 640, and 650 by using a direct memory access (DMA) method and thus data is output from the motion compensation operation queue 710 to the motion compensation processors 630, 640, and 650 by using the DMA method.

As described above with reference to FIG. 6, synchronization signals may be exchanged between the central processor 610 and the motion compensation processors 630, 640, and 650 through a mailbox.

In the exemplary embodiments of the present invention, operations between processors are performed in parallel in a pipeline structure. Thus, the central processor 610 stacks the motion compensation operation parameter blocks 730, 740, and 750 of data units to be processed by the motion compensation processors 630, 640, and 650, respectively, on the motion compensation operation queue 710 in advance. The operations to be performed in parallel in the pipeline structure will be described later in detail with reference to FIG. 8.

According to an exemplary embodiment of the present invention, a frame may be partitioned into a plurality of macroblocks as data regions. A data region may include a plurality of macroblocks and one operation processor performs the motion compensation on one data region during a current data processing period.

According to an exemplary embodiment of the present invention, in order not to separate pieces of data having mutual dependency on each other, a data region partitioning unit may detect the data having mutual dependency on multimedia data, and determine data regions so as not to separate the pieces of data having mutual dependency on each other. For example, when the data regions are determined, a predicted (P) frame and a bidirectional (B) frame having mutual dependency on each other may be included in the same data region.

If a first piece of data has mutual dependency on two or more other pieces of data, one of the other pieces of data may be determined so as to be included in the same data region in which the first piece of data is to be included.

For example, if a B frame (the first data) refers to previous and subsequent P frames (the two or more other pieces of data having mutual dependency on the first piece of data), and if the data regions have to be partitioned at a border between the B frame and the previous P frame or at a border between the B frame and the subsequent P frame, the data region partitioning unit may determine at which border the data regions are partitioned.

Figure 8:
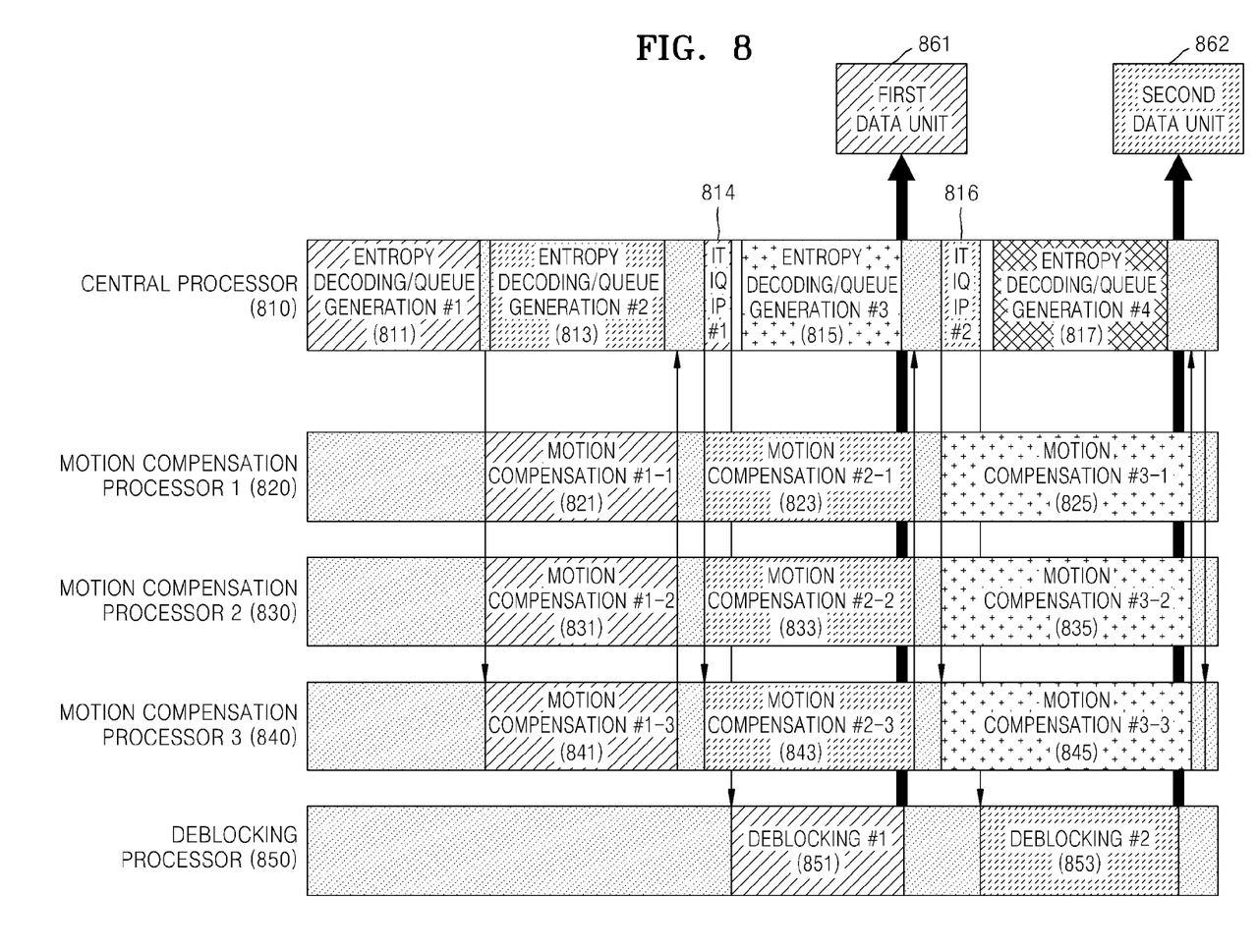
FIG. 8 is a diagram for describing a method of processing data in parallel in a pipeline structure, according to an exemplary embodiment of the present invention.

FIG. 8 is a diagram for describing a method of processing data in parallel in a pipeline structure, according to an exemplary embodiment of the present invention.

In FIG. 8, a frame is used as an example of a data processing unit and quarterly partitioned data regions of the frame are used as an example of data units included in the data processing unit.

Referring to FIG. 8, the method is performed as follows.

1. A central processor 810 performs an entropy decoding and queue generation operation 811 on a first data unit and then outputs the first data unit to motion compensation processors 820, 830, and 840.

2. While the motion compensation processors 820, 830, and 840 perform motion compensation operations 821, 831, and 841 on the first data unit, the central processor 810 performs an entropy decoding and queue generation operation 813 on a second data unit.

During a current data unit processing period, the first data unit is output to the central processor 810 and the second data unit is output to the motion compensation processors 820, 830, and 840.

When the motion compensation operations 821, 831, and 841 and the entropy decoding and queue generation operation 813 are completely performed, the central processor 810 and the motion compensation processors 820, 830, and 840 are ready for a next data unit.

3. While the motion compensation processors 820, 830, and 840 perform motion compensation operations 823, 833, and 843 on the second data unit, the central processor 810 performs an inverse transformation/inverse quantization/intra prediction operation 814 on the first data unit and then outputs the first data unit to a deblocking processor 850 after the inverse transformation/inverse quantization/intra prediction operation 814 is completely performed.

The deblocking processor 850 performs a deblocking operation 851 on the first data unit and then ultimately generates a restored first data unit 861 after the deblocking operation 851 is completely performed.

The central processor 810 performs an entropy decoding and queue generation operation 815 on a third data unit after the inverse transformation/inverse quantization/intra prediction operation 814 is completely performed.

When the motion compensation operations 823, 833, and 843 are completely performed, the motion compensation processors 820, 830, and 840 output the second data unit to the central processor 810.

When the deblocking operation 851, the motion compensation operations 823, 833, and 843, and the entropy decoding and queue generation operation 815 are completely performed, next operations are ready be performed by parameter blocks which are output from a queue generated by the entropy decoding and queue generation operation 815 to the motion compensation processors 820, 830, and 840 and the deblocking processor 850.

Step 4. The above-described steps 1, 2, and 3 are repeatedly performed. Thus, while the central processor 810 performs an inverse transformation/inverse quantization/intra prediction operation 816 on the second data unit, and performs an entropy decoding and queue generation operation 817 on a fourth data unit, the motion compensation processors 820, 830, and 840 perform motion compensation operations 825, 835, and 845 on the third data unit and the deblocking processor 850 performs a deblocking operation 853 on the second data unit. Also, the deblocking processor 850 ultimately generates a restored second data unit 862 after the deblocking operation 853 is completely performed.

According to an exemplary embodiment of the present invention, synchronization of operations is guaranteed between the central processor 810 and the motion compensation processors 820, 830, and 840. Also, respectively and simultaneously, the motion compensation processor 820 performs the motion compensation operations 821, 831, and 841, the motion compensation processor 830 performs the motion compensation operations 823, 833, and 843, and the motion compensation processor 840 performs the motion compensation operations 825, 835, and 845, of data units in data regions.

Figure 9:
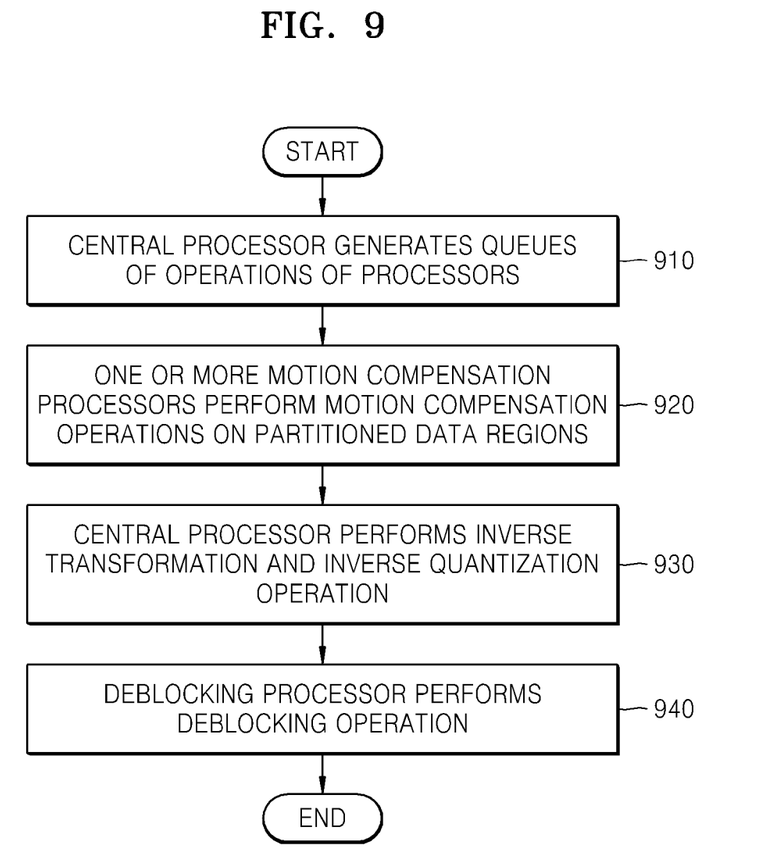
FIG. 9 is a flowchart of a multimedia decoding method based on a multi-core platform, according to an exemplary embodiment of the present invention.

FIG. 9 is a flowchart of a multimedia decoding method based on a multi-core platform, according to an exemplary embodiment of the present invention.

Referring to FIG. 9, in operation 910, a central processor performs a queue generation operation on input multimedia data so as to generate queues of one or more operations of the multimedia data which are to be performed by the central processor or operation processors.

The central processor may read the input multimedia data, perform an initializing operation on the read multimedia data in order to decode the multimedia data, and perform an entropy decoding operation on the initialized multimedia data. The central processor may also perform at least one of an inverse transformation operation, an inverse quantization operation, and an intra prediction operation on the multimedia data. The multimedia data on which a deblocking operation is performed may be stored by the central processor.

Here, the queues of the operations of the entropy decoded multimedia data may be generated.

In operation 920, one or more motion compensation processors from among all the operation processors perform motion compensation operations on partitioned data regions of the multimedia data.

In operation 930, the central processor performs an inverse transformation and inverse quantization operation on the motion compensated multimedia data.

In operation 940, a deblocking processor from among all the operation processors performs a deblocking operation on the inverse transformed and inverse quantized multimedia data.

Synchronization signals are exchanged between the central processor and the operation processors through a mailbox.

Data may be exchanged between the central processor and the operation processors by using a DMA method.

The motion compensation operations which are performed on the data regions by the motion compensation processors may be synchronized.

Operations of the central processor and the operation processors may be performed in parallel in a pipeline structure.

The exemplary embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), and storage media such as carrier waves (e.g., transmission through the Internet).

As described above, according to the exemplary embodiments of the present invention, multimedia data having high capacity and being operationally intensive may be efficiently processed by effectively using multiprocessor resources in a hybrid partitioning method having advantages of a data partitioning method and a functional partitioning method.

Also, the multimedia data may be efficiently processed in parallel by multiprocessors by calculating operation loads of operation loads in partitioned data regions and equally allocating the operation loads to operation processors.

Furthermore, a central processor may sequentially queue operation parameters in accordance with a processing order of processors and thus the processors may efficiently perform operations in a pipeline structure. In addition, operation synchronization may be guaranteed between multiprocessors and thus data may be processed in parallel by the multiprocessors.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A multimedia decoding method based on a mold-core platform including a central processor and a plurality of operation processors, the multimedia decoding method comprising:

performing a queue generation operation on input multimedia data to generate queues of one or more operations of the multimedia data which are to be performed by the central processor and the operation processors, wherein the queue generation operation is performed by the central processor;

determining operation loads for motion compensation operations of the multimedia data relative to queue generation operation and deblocking operation;

determining a number of data regions of the multimedia data to be partitioned based on the determined operation loads;

partitioning the multimedia data into the data regions in accordance with the determined number of data regions;

determining a number of motion compensation processors from among the plurality of operation processors to be the same as the number of data region of the multimedia data;

performing motion compensation operations on the partitioned data regions of the multimedia data by the determined number of motion compensation processors; and performing the deblocking operation on the multimedia data by an operation processor from among the plurality of operation processors, other than the determined number of processors for motion compensation operations.

2. The multimedia decoding method of claim 1, further comprising:

reading the input multimedia data by the central processor;

performing an initializing operation on the read multimedia data to decode the multimedia data by the central processor;

performing an entropy decoding operation on the initialized multimedia data by the central processor;

performing at least one of an inverse transformation operation, an inverse quantization operation, and an intra prediction operation on the multimedia data by the central processor; and storing the deblocked multimedia data by the central processor, wherein the performing the queue generation operation comprises performing the queue generation operation on the entropy decoded multimedia data.

3. The multimedia decoding method of claim 2, wherein operations of the central processor and the operation processors are performed in parallel in a pipeline structure.

4. The multimedia decoding method of claim 3, wherein each data processing unit of the multimedia data is partitioned into N data units and n is a positive number greater than 1 and less than N, and wherein the operations of the central processor and the operation processors comprise:

performing the entropy decoding operation and the queue generation operation on an (n−1)th data unit by the central processor;

performing the motion compensation operations on the (n−1)th data unit by the motion compensation processors, and performing the entropy decoding operation and the queue generation operation on an (n) th data unit by the central processor; and performing the inverse transformation operation, the inverse quantization operation, and the intra prediction operation on the (n−1)th data unit by the central processor, performing the motion compensation operations on the (n) th data unit by the motion compensation processors, performing the entropy decoding operation and the queue generation operation on an (n+1)th data unit by the central processor, and performing the deblocking operation on the (n−1)th data unit by the operation processor so as to restore the (n−1) th data unit.

5. The multimedia decoding method of claim 1, wherein the performing the queue generation operation comprises inputting operation parameter blocks including operation parameters of the operations to the queues.

6. The multimedia decoding method of claim 5, wherein the performing the queue generation operation comprises transmitting the operation parameter blocks from the queues to the operation processors corresponding to the queues.

7. The multimedia decoding method of claim 6, wherein the transmitting the operation parameter blocks comprises:

determining the operation parameter blocks which are processed by the operation processors for a predetermined unit period of time; and transmitting the determined operation parameter blocks to the operation processors at each unit period of time.

8. The multimedia decoding method of claim 1,
wherein, if a queue of the motion compensation operations is generated, the performing the queue generation operation comprises generating the queue of the motion compensation operations which includes operation parameter blocks to be performed on the data regions by the motion compensation processors.

9. The multimedia decoding method of claim 8, wherein the performing the queue generation operation comprises:

storing the operation parameter blocks of the partitioned data regions in the queue of the motion compensation operations in accordance with a processing order of the data regions; and transmitting the operation parameter blocks of the partitioned data regions from the queue of the motion compensation operations to the motion compensation processors in accordance with the processing order of the data regions.

10. The multimedia decoding method of claim 1, wherein the partitioning the multimedia data into the data regions comprises:

detecting pieces of data having mutual dependency on each other, from the multimedia data; and determining the data regions so as not to separate the pieces of data having mutual dependency on each other.

11. The multimedia decoding method of claim 10, wherein, if a first piece of data has mutual dependency on two or more other pieces of data, the determining of the data regions comprises determining one of the other pieces of data so as to be included in a same data region in which the first piece of data is to be included.

12. The multimedia decoding method of claim 1, wherein synchronization signals are exchanged between the central processor and the operation processors through a mailbox.

13. The multimedia decoding method of claim 1, wherein data is exchanged between a memory of the central processor and memories of the operation processors by using a direct memory access method.

14. The multimedia decoding method of claim 1, wherein the motion compensation operations which are performed on the data regions by the motion compensation processors are synchronized.

15. A non-transitory computer readable recording medium having recorded thereon a computer program for executing the method of claim 1.

16. A multimedia decoding apparatus based on a multi-core platform including a central processor and a plurality of operation processors, the multimedia decoding apparatus comprising:

a queue generation unit which performs, by the central processor, a queue generation operation on input multimedia data to generate queues of one or more operations of the multimedia data which are to be performed by the central processor or the operation processors by the central processor;

a data region partitioning unit which determines operation loads of motion compensation operations of the multimedia data relative to the queue generation operation and a deblocking operation, determines a number of data regions of the multimedia data to be partitioned based on the determined operation loads, and partitions the multimedia data into the data regions in accordance with the determined number of data regions;

a motion compensation processor determination unit which determines a number of motion compensation processors from among the plurality of operation processors to be the same as the number of data regions of the multimedia data;

a motion compensation unit which performs motion compensation operations on the partitioned data regions of the multimedia data by the determined number of motion compensation processors; and a deblocking unit which performs the deblocking operation on the multimedia data by an operation processor from among the plurality of operation processors, other than the determined number of processors for motion compensation operations.

17. The multimedia decoding apparatus of claim 16, wherein the central processor reads the input multimedia data, performs an initializing operation on the read multimedia data to decode the multimedia data, performs an entropy decoding operation on the initialized multimedia data, performs at least one of an inverse transformation operation, an inverse quantization operation, and an intra prediction operation on the multimedia data, and stores the deblocked multimedia data, and wherein the queue generation unit performs the queue generation operation on the entropy decoded multimedia data.

18. The multimedia decoding apparatus of claim 17, wherein operations of the central processor and the operation processors are performed in parallel in a pipeline structure.

19. The multimedia decoding apparatus of claim 18, wherein each data processing unit of the multimedia data is partitioned into N data units and n is a positive number greater than 1 and less than N, and wherein the operations of the central processor and the operation processors comprise:

performing the entropy decoding operation and the queue generation operation on an (n−1)th data unit by the central processor;

performing the motion compensation operations on the (n−1)th data unit by the motion compensation processors, and performing the entropy decoding operation and the queue generation operation on an (n) th data unit by the central processor; and performing the inverse transformation operation, the inverse quantization operation, and the intra prediction operation on the (n−1)th data unit by the central processor, performing the motion compensation operations on the (n) th data unit by the motion compensation processors, performing the entropy decoding operation and the queue generation operation on an (n+1)th data unit by the central processor, and performing the deblocking operation on the (n−1)th data unit by the operation processor so as to restore the (n−1)th data unit.

20. The multimedia decoding apparatus of claim 16, wherein the queue generation unit inputs operation parameter blocks including operation parameters of the operations to the queues.

21. The multimedia decoding apparatus of claim 20, wherein the queue generation unit comprises an operation parameter block transmission unit for transmitting the operation parameter blocks from the queues to the operation processors corresponding to the queues.

22. The multimedia decoding apparatus of claim 21, wherein the operation parameter block transmission unit determines the operation parameter blocks which are processed by the operation processors for a predetermined unit period of time, and transmits the determined operation parameter blocks to the operation processors at each unit period of time.

23. The multimedia decoding apparatus of claim 16, wherein, if a queue of the motion compensation operations is generated, the queue generation unit generates the queue of the motion compensation operations which includes operation parameter blocks to be performed on the data regions by the motion compensation processors.

24. The multimedia decoding apparatus of claim 23, wherein the queue generation unit stores the operation parameter blocks of the partitioned data regions in the queue of the motion compensation operations in accordance with a processing order of the data regions, and transmits the operation parameter blocks of the partitioned data regions from the queue of the motion compensation operations to the motion compensation processors in accordance with the processing order of the data regions.

25. The multimedia decoding apparatus of claim 16, wherein the data region partitioning unit detects pieces of data having mutual dependency on each other, from the multimedia data, and determines the data regions so as not to separate the pieces of data having mutual dependency on each other.

26. The multimedia decoding apparatus of claim 25, wherein, if a first piece of data mutual dependency on two or more other pieces of data, the data region partitioning unit determines one of the other pieces of data so as to be included in a same data region in which the first data is to be included.

27. The multimedia decoding apparatus of claim 16, wherein synchronization signals are exchanged between the central processor and the operation processors through a mailbox.

28. The multimedia decoding apparatus of claim 16, wherein data is exchanged between a memory of the central processor and memories of the operation processors by using a direct memory access method.

29. The multimedia decoding apparatus of claim 16, wherein the motion compensation operations which are performed on the data regions by the motion compensation processors are synchronized.

\* \* \* \* \*